(12) United States Patent
Hewitt et al.

(10) Patent No.: US 10,691,895 B2
(45) Date of Patent: Jun. 23, 2020

(54) DYNAMIC TEXT GENERATION FOR SOCIAL MEDIA POSTS

(71) Applicant: INTERNATIONAL BUSINESS MACHINES CORPORATION, Armonk, NY (US)

(72) Inventors: Trudy L. Hewitt, Cary, NC (US); Shadi Albouyeh, Raleigh, NC (US); Lin Sun, Cary, NC (US); Kelley Anders, East New Market, MD (US)

(73) Assignee: International Business Machines Coporation, Armonk, NY (US)

( * ) Notice: Subject to any disclaimer, the term of this patent is extended or adjusted under 35 U.S.C. 154(b) by 147 days.

(21) Appl. No.: 16/039,413

(22) Filed: Jul. 19, 2018

(65) Prior Publication Data

US 2020/0026755 A1    Jan. 23, 2020

(51) Int. Cl.
| | |
|---|---|
| *G06F 40/30* | (2020.01) |
| *H04L 12/58* | (2006.01) |
| *G06N 20/00* | (2019.01) |
| *G06F 16/955* | (2019.01) |
| *G06F 16/9535* | (2019.01) |

(Continued)

(52) U.S. Cl.
CPC ........ *G06F 40/30* (2020.01); *G06F 16/24575* (2019.01); *G06F 16/955* (2019.01); *G06F 16/9535* (2019.01); *G06F 40/295* (2020.01); *G06N 20/00* (2019.01); *H04L 51/32* (2013.01)

(58) Field of Classification Search
CPC .......... G06F 40/30; G06F 40/00; G06F 40/10; G06F 40/191; G06F 40/20; G06F 40/205; G06F 40/216; G06F 40/279; G06F 40/295; G06F 40/35; G06F 40/56

USPC .................................. 704/9, 1, 10, 4, 257
See application file for complete search history.

(56) References Cited

U.S. PATENT DOCUMENTS

| | | | |
|---|---|---|---|
| 8,676,891 B2 * | 3/2014 | Su | ............... H04W 4/21 709/204 |
| 9,317,583 B2 | 4/2016 | Alonso et al. | |
| 9,456,229 B2 | 9/2016 | Anders et al. | |

(Continued)

OTHER PUBLICATIONS

Twitter, "Optimize Tweets with Cards", https://developer.twitter.com/en/docs/tweets/optimize-with-cards/overvie . . . , printed May 16, 2018, pp. 1-3.

(Continued)

*Primary Examiner* — Qi Han
(74) *Attorney, Agent, or Firm* — Michael O'Keefe

(57) ABSTRACT

Utilizing a computing device to share a social media post with automatically generated dynamic text in a social media service in real time. A computing device receives a social media post from a social media user computer. The computing device monitors social media activities of a social media user computer. The computing device accesses one or more social media activities of social media follower computers. The computing device compares social media activities of the social media user computer with the one or more social media activities of social media follower computers. The computing device aligns the received social media post to a preference model. The computing device generates dynamic text in real time to accompany the received social media post. The computing device outputs the generated dynamic text to the social media user computer to accompany the received social media post.

20 Claims, 7 Drawing Sheets

(51) Int. Cl.
    *G06F 16/2457*     (2019.01)
    *G06F 40/295*     (2020.01)

(56) References Cited

U.S. PATENT DOCUMENTS

| | | | |
|---|---|---|---|
| 9,495,693 | B2 | 11/2016 | Box et al. |
| 2004/0267816 | A1 | 12/2004 | Russek |
| 2012/0185238 | A1* | 7/2012 | Bhatti .................... G06Q 50/01 |
| | | | 704/9 |
| 2014/0156681 | A1 | 6/2014 | Lee et al. |
| 2014/0188627 | A1 | 7/2014 | Elvekrog et al. |
| 2016/0007083 | A1* | 1/2016 | Gurha .............. H04N 21/44222 |
| | | | 725/13 |
| 2016/0078471 | A1* | 3/2016 | Hamedi ............ G06F 16/24578 |
| | | | 705/14.41 |
| 2016/0148108 | A1* | 5/2016 | Jericho .................... G06N 5/04 |
| | | | 706/11 |
| 2017/0132821 | A1 | 5/2017 | Valliani et al. |

OTHER PUBLICATIONS

Mell et al., "The NIST Definition of Cloud Computing", National Institute of Standards and Technology, Special Publication 800-145, Sep. 2011, pp. 1-7.

\* cited by examiner

DYNAMIC TEXT GENERATION FOR SOCIAL MEDIA POSTS

BACKGROUND

The present invention relates generally to social media, and more specifically to automatic generation of social media posts.

BRIEF SUMMARY

Embodiments for the present invention disclose a method, a computer program product, and a computer system for sharing a social media post with automatically generated dynamic text in a social media service in real time. A computing device receives a social media post from a social media user computer. The computing device monitors one or more social media activities of a social media user computer. The computing device accesses one or more social media activities of social media follower computers. The computing device compares the one or more social media activities of the social media user computer with the one or more social media activities of social media follower computers based on common entities included in both the social media activities of the social media user computer and the social media follower computers. The computing device aligns the received social media post to a preference model, wherein the preference model is based on the compared social media activities of the social media user computer compared with the one or more social media activities of social media follower computers. The computing device generates dynamic text in real time to accompany the received social media post. The computing device outputs the generated dynamic text as a post notification to the social media user computer to accompany the received social media post. The computing device learns the behavioral changes in the social media activities and incorporates the learned changes into the generated text.

DETAILED DESCRIPTION

Figure 1:
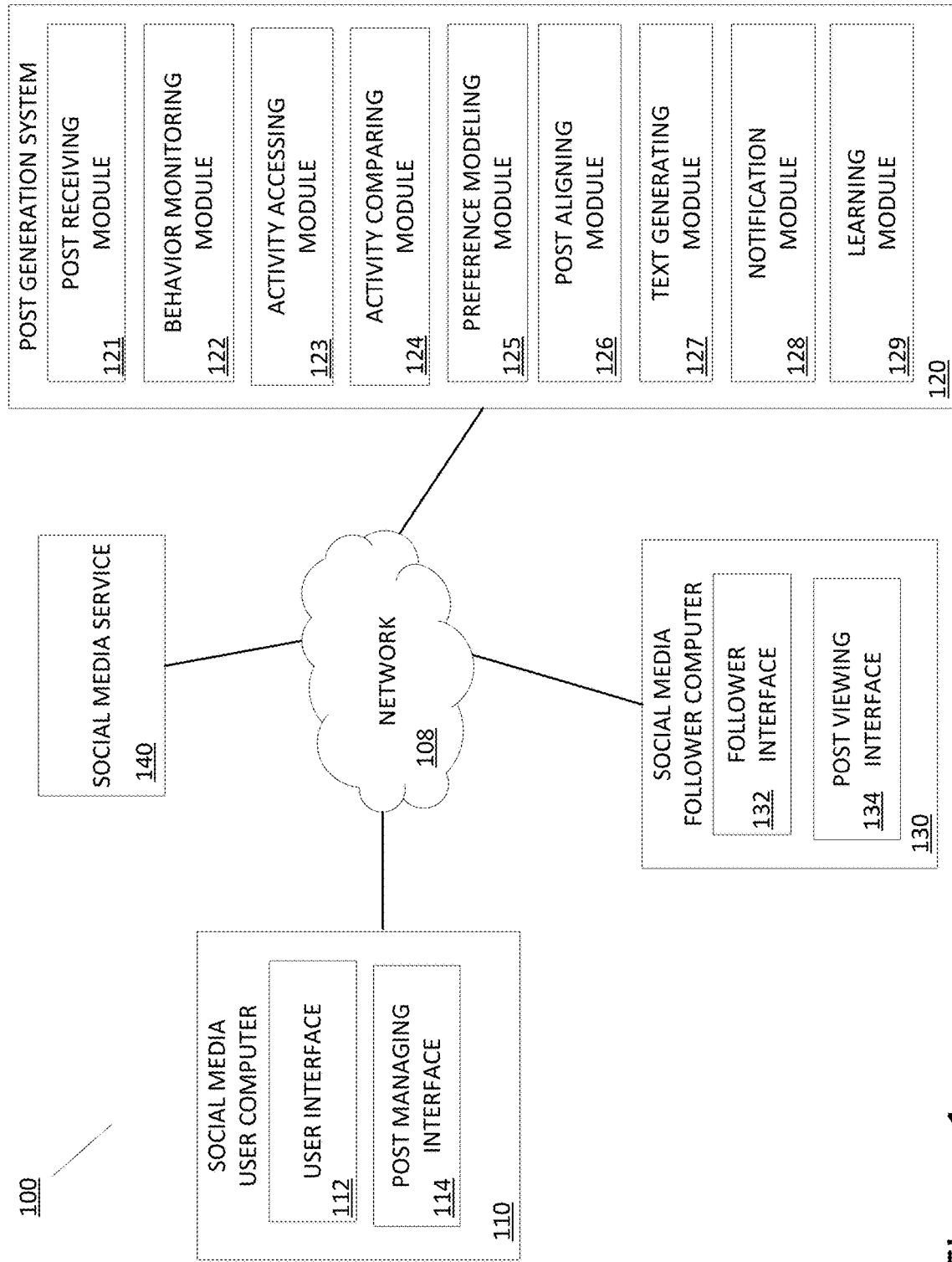
FIG. 1 is a block diagram illustrating a dynamic text generation environment 100 for generating dynamic text to accompany a social media post or repost, in accordance with an embodiment of the present invention.

Social media services are increasingly used as a means of sharing information that may include text, website hyperlinks, videos, audio files, pictures, etc. among all participating social media users via "social media posts." Social media services may be used to express individual feelings, opinions, or reactions of the social media users to information contained in social media posts by adding commentary to social media posts, reposting social media posts, or utilizing the information contained in social media posts in his or her own way.

In the context of companies and other organizations maintaining social media presences, social media services may be utilized by the companies and other organizations to publish social media posts and reposts to promote themselves, their products, their services, etc., and may encourage other social media users to share information and opinions about the products, services, etc. to their followers. These companies or organizations may, for example, encourage users to share a relevant social media post to spread awareness about the company or organization, along with the user expressing his or her own feelings, opinion, or reaction to the social media post by adding his own or her own commentary to the post of his own or her own, and/or reposting the social media post. The company or organization may desire to have as much unique commentary as possible from multiple social media users to best encourage followers of the company or organization to investigate or learn more, and actually provide benefits such as incentives to encourage social media users to share unique commentary. The social media user purporting to create unique commentary, however, may merely share previously written text verbatim regarding the social media posts written by other social media users, while seeking the incentives offered. The user may thus publish a social media post or repost with similar text to that of other users who share the same link, not fully serving the company or organization's desire of each social media follower sharing unique commentary. In other situations as well it may be advantageous to automatically generate text to accompany a social media post. Presented are a method, a system, and a computer program product for using a dynamic text generator for automatically generating text to accompany a social media post containing a shared link, repost, and/or other multimedia in a social media service.

A "social media service" 140 (or if referring to a plurality, "social media services") are websites, applications, and/or other computer software that enables users build a social network with other individuals, allowing for the generation and cultivation of social relations between individuals, businesses, organizations, societies, clubs, etc., utilizing the social media service 140. Included with the majority of social media service(s) 140 is the ability to participate in public and/or private social networking via the social media service 140, including the creation and sharing of public or private content via social media posts. The created or shared content in social media posts may be text-based, video-based, audio-based, or image-based, etc., as further discussed elsewhere herein. All social media services 140, including all social media service 140 software components, as well as all software protocols and associated functionality for creating and publishing posts or reposts are contemplated for usage with the presently disclosed invention. A user utilizing a social media user computer 110, as further discussed herein, makes available various electronic content via the social media service 140 to various followers of the user accessing the social media service 140 via social media user computer(s) 110, also as further discussed herein.

"Social media post" or "post" as discussed herein refers to a text-based, video-based, image-based, audio-based, or alternatively-based electronic publications that share electronic content on social media service 140. Social media posts are transmitted in real-time to social media follower computer(s) 130 via the social media service 140 on a requested basis, a scheduled basis, or otherwise, and are made available to users and followers via any sort of network 108 (such as the internet) the social media service 140 functions on. Posts may be text-based, and/or contain multimedia including but not limited to video, image, audio, or have links to other websites, servers, resources, etc. embedded within (or otherwise linked) to such data available elsewhere over the network.

"Social media repost" or "repost" as discussed herein refer to previously published text-based, video, image-based, audio-based, etc. electronic publications that are being retransmitted by a social media user to social media followers. Reposts may include additional dynamic text, multimedia such as videos, images, audio, etc., or have links to other websites, servers, resources, etc. embedded within (or otherwise linked) to such data available elsewhere over the network. Social media reposts are transmitted in real-time to social media follower computer(s) 130 via the social media service 140 on a requested basis, a scheduled basis, or otherwise, and are made available to users and followers via any sort of computer network (such as the internet) the social media service 140 functions on.

Social media posts and reposts may be published (i.e. available on a social media service 140 for viewing by users) or unpublished (i.e. not yet available for viewing on the social media service 140), and may contain links to other websites, servers, resources, etc. Published social media posts and reposts are accessible to social media user computer(s) 110 and social media followers at social media follower computer(s) 130 as static text which is incapable of being edited or dynamic text which is capable of being edited by social media user computer 110 prior to final publication on social media service 140 to social media follower computer(s) 130.

FIG. 1 is a block diagram illustrating a dynamic text generation environment 100 for generating dynamic text for sharing with a social media post or repost, in accordance with an embodiment of the present invention.

In various embodiments of the invention, one or more social media user computer(s) 110 accesses a social media service 140 via network 108 to socially network with other users of the social media service 140, such as by writing and publishing a post or repost about a certain topic for viewing by users at one or more social media follower computer(s) 130. When accessing the social media service 140, one or more social media follower computer(s) 130 browse social media service 140 for posts with topics and/or links of interest. In these embodiments, rather than manually write and publish a post/repost on the social media service 140, as further discussed herein, social media user computer 110 uses post generation system 120 to automatically generate dynamic text for the social media post or repost, which is subsequently viewed by social media follower computer(s) 130.

When utilized, post generation system 120 automatically generates dynamic text for both unpublished social media posts (i.e., those drafted but not yet published on social media service 140), as well as reposts (i.e., those that have been previously published/posted on social media service 140). Post generation system 120 utilizes natural language processing software to generate text within the post or repost having a correct intent and tone. In various embodiments, post generation system 120 outputs a text-based, video-based, audio-based, or image-based recommendation in real time that is consistent with the intent and tone of historical posts or reposts previously posted in the social media service 140, while being unique and distinguishable from those already published.

Functionally, post generation system 120 models the most favored entities occurring in previous social media posts or reposts by a user of social media follower computer 130. Post generation system 120 outputs text in real time that makes the unpublished post or repost unique from already published posts and reposts sharing the same link, while aligned with the preferences of social media follower computer 130.

In a further embodiment, a user of social media user computer 110 writes but does not publish via the social media service 140 a social media post or repost sharing a text-based, video-based, image-based, audio-based, etc. link accompanied with dynamic text. In this embodiment, social media user computer 110 is able to edit the unpublished post by directly editing the dynamic text before it is published on the social media service 140 by the social media user computer 110.

In various embodiments of the invention, social media user computer 110, post generation system 120, social media follower computer 130, and social media service 140 are connected via network 108. Network 108 represents, for example, an internet, a local area network (LAN), a wide area network (WAN) such as the Internet, and includes wired, wireless, or fiber optic connections. In general, network 108 may be any combination of connections and protocols that will support communications between social media user computer 110, post generation system 120, social media follower computer 130, and social media service 140 in accordance with an embodiment of the invention.

In various embodiments, social media user computer 110, post generation system 120, social media follower computer 130, and social media service 140 may be, for example, a mainframe or a mini computer, a terminal, a laptop, a tablet, a netbook personal computer (PC), a mobile device, a desktop computer, or any other sort of computing device, in accordance with embodiments described herein. Social media user computer 110, post generation system 120, social media follower computer 130, and social media service 140 may include internal and external hardware components as depicted and described further in detail with reference to FIG. 4, below. In other embodiments, each of social media user computer 110, post generation system 120, social media follower computer 130, and social media service 140 may be implemented in a cloud computing environment, as described in relation to FIGS. 5 and 6, below. In a still further embodiment, some or all of social media user computer 110, post generation system 120, social media follower computer 130, and social media service 140 are embodied in physically the same computing device, with all communications between various components made internally.

In an embodiment of the invention, social media user computer 110 includes a user interface 112 and a post managing interface 114.

User interface 112 is a physical or virtual visible display (such as display screen 920), such as a graphical user interface (GUI) for a user at social media user computer 110 to create a social media post or repost with dynamic text utilizing the presently disclosed invention. User interface 112, as further discussed below, also serves to receive a pop-up or push notification accompanying a published or unpublished social media post with recommended text for posting to the social media service 140 generated by the post generation system 120, as discussed further herein.

Post managing interface 114 is a physical or virtual visible display (such as display screen 920) for user at social media user computer 110 to create a social media post or repost sharing a link with dynamic text that is generated by post generation system 120. The post or repost may be regarding any topic or limited to a certain gamut of topics, in various embodiments of the invention. As discussed elsewhere herein, the post or repost may be text-based in nature and/or may include images, audio, or videos, or links to resources available on another webpage, server, computer, etc. In an embodiment of the present invention, after transmission of the post or repost by the social media user computer 110, recommended text generated by the post generation system 120 is transmitted back as a pop-up or push notification to the user interface social media user computer 110 for display in the post or repost, allowing social media user computer 110 to incorporate the recommended text to the social media post or repost, if desired. Once social media user computer 110 publishes the post or repost to social media service 140, social media follower computer 130 has access to the post or repost (as static text) from social media service 140 for viewing by a follower at the social media follower computer 130.

In an embodiment of the invention, social media follower computer 130 includes a follower interface 132 and a post viewing interface 134.

Follower interface 132 is a physical or virtual visible display, such as a graphical user interface (GUI) displayed such as with display screen 920 for a follower at social media follower computer 130 to edit a post or repost prior to or after publication on the social media service 140 by social media user computer 110.

Post viewing interface 134 is a physical or virtual visible display for a user at social media follower computer 130 to view a social media post or repost published by social media user computer 110 to the social media service 140. Post viewing interface 134 enables social media follower computer 130 to access and view a post or repost published by social media user computer 110 from social media service 140.

In an embodiment of the invention, post generation system 120 includes a post receiving module 121, a behavior monitoring module 122, an activity accessing module 123, an activity comparing module 124, a preference modeling module 125, a post aligning module 126, a text generating module 127, a notification module 128, and a learning module 129. In this embodiment, post generation system 120 may be implemented as an installable desktop application, an installable mobile application, an extension to a web browser/other software, or in an equivalent fashion.

Post receiving module 121 is a hardware and/or software component for post generation system 120 to receive a social media post or repost from social media user computer 110 for further use as discussed herein. The post or repost may be unpublished or published on the social media service 140, and contain text, multimedia, or links to multimedia available elsewhere.

Behavior monitoring module 122 is a hardware and/or software component for post generation system 120 to monitor the social media activities corresponding to a user of social media user computer 110 on social media service 140. In various embodiments, behavior monitoring module 122 may utilize natural language processing to parse and interpret posts and reposts by the user of social media user computer 110. The natural language processing hardware/software may be rule-based in nature or based on a machine learning model. The natural language processing hardware/software may, in a preferred embodiment, extract intent, entities, and/or sentiment from parsed text and/or audio, images, video, or other multimedia in each post or repost for later use. "Entities" include both entity types and entity subtypes which categorize elements of each post or repost, such as that which may be available in text or other content available in each social media post. Examples of entities include, for example people, places, things, etc. "Intent" includes purposes and/or goals expressed included in each post or repost, such as that expressing an opinion or presenting an argument. "Sentiment" includes text or other content that expresses a positive, negative, or neutral opinion towards a specific entity or otherwise. Examples of sentiment include a negative opinion towards taxes (e.g. "Taxes are too high."), a positive opinion towards nature (e.g. "Nature is beautiful."), a neutral opinion towards cars (e.g. "I use a car."), etc.

Activity accessing module 123 is a hardware and/or software component for post generation system 120 to monitor and record social media activity of one or more social media follower computers 130 and/or one or more social media user computers 110. "Social media activity" as discussed herein includes published posts and reposts which may contain text and/or multimedia, shared links (containing links to other multimedia, websites, etc.), and reactions to other social media posts or reposts, including likes, dislikes, saved posts/reposts, ignored posts/reposts (detected, for example, by a user scrolling through a social media feed and not stopping to view a post/repost), etc. In an embodiment of the invention, activity accessing module 123 accesses the social media activity of social media follower computer 130 via network 108 in order to compare social media activity, as described in connection with activity comparing module 124 elsewhere herein.

Activity comparing module 124 is a hardware and/or software component for comparing the social media activity corresponding to the user of social media user computer 110 to that of the user of social media follower computer 130 to determine the one or more common entities, intents, and/or sentiments that are included in the social media activity of both social media user computer 110 and social media follower computer 130. In an embodiment of the invention, activity comparing module 124 identifies common entities and sentiment using natural language processing to parse and interpret the text and/or other content in the social media activity of social media user computer 110 and/or social media follower computer 130.

Preference modeling module 125 is a hardware and/or software component to generate a preference model capable of modeling which entities, intents, and/or sentiments a follower at social media follower computer 130 would prefer to view in a post or repost. The preference model is generated based on comparisons performed by the activity comparing module 124 and as discussed elsewhere herein. In an embodiment of the invention, preference modeling module 125 ranks the popularity of certain entities, intents, and/or sentiments by gathering the frequency of use of entities/intents/sentiments included in the collected social media activity of both the social media user computer 110 and social media follower computer 130. In a further embodiment of the invention, the preference model is based on the compared social media activities of the social media user computer 110 compared with the one or more social media activities of the social media follower computer(s) 130.

Post aligning module 126 is a hardware and/or software component for aligning one or more social media user computer 110's posts and reposts to the ranked topics in the preference model, generated by preference modeling module 125.

Text generating module 127 is a hardware and/or software component for generating dynamic or static text to be utilized in a social media post (that may or may not accompany a shared link, or other multimedia, etc.). As further discussed herein, in connection with behavior monitoring module 122, activity accessing module 123, activity comparing module 124, preference aligning module 125, post aligning module 126, and discussed elsewhere herein, post generation system 120 may utilize natural language processing or other means to parse and analyze text that has been used in published social media posts or reposts that share the same link within the social media service 140. Text generating module 127 uses the data obtained, with or without natural language processing software, to generate dynamic or static text (that may be accompanying a shared link, other multimedia, etc.) that is consistent with the writing style, opinions, preferences, personality, etc. of the user while being unique from posts and reposts of other social media user computer(s) 110 that share the same link. In embodiments of the present invention, text generating module 127 functions in real-time to generate the text on a real-time basis but, in alternative embodiments of the invention, operates on a scheduled basis or otherwise to generate text for social media posts on a daily, weekly, monthly, annual basis, etc. Other bases are specifically contemplated herein.

Notification module 128 is a hardware and/or software component for outputting the generated dynamic or static text generated by the text generating module 127 to social media user computer 110 via the post managing interface 114. In an embodiment of the invention, the recommended text may be presented to the user in the form of a push notification or pop-up window that may be displayed on post managing interface 114 (although any computerized manner of messaging the generated dynamic or static text is contemplated). In the various embodiments, the user of social media user computer 110 receives the push notification, pop-up window, or other computerized message, and, if selected for publication by the user, the generated text is automatically presented on the social media service 140, as well as, if appropriate, the shared link, other media, etc., via social media service 140.

Learning module 129 is a hardware and/or software component for learning changes in the behavior of the user which may result in the publication of the post or repost. In an embodiment of the invention, learning module 129 utilizes a machine learning algorithm to determine if there are any changes in the behavior of the user (i.e., sentiment towards certain entities, intents, and/or sentiments) based on a post or repost. Learning module 129 feeds these one or more changes to behavior monitoring module 122 for text generating module 127 to generate text appropriate to the one or more changes.

In the preferred embodiment, a social media service 140, as discussed elsewhere herein, is a website, application, and/or other form of computer software available via network 108. Social media service 140 allows for the generation and cultivation of social relations between individuals, businesses, organizations, societies, clubs, etc. taking a form of computer-mediated electronic communication through which social media user computer 110 creates one or more online communities to share ideas, information, personal messages, and other content with one or more social media follower computers 130. In the preferred embodiment, social media service 140 may be implemented as one or more application programs, as an installable desktop application, a mobile application, an extension of an application, or in an equivalent fashion.

Figure 2A:
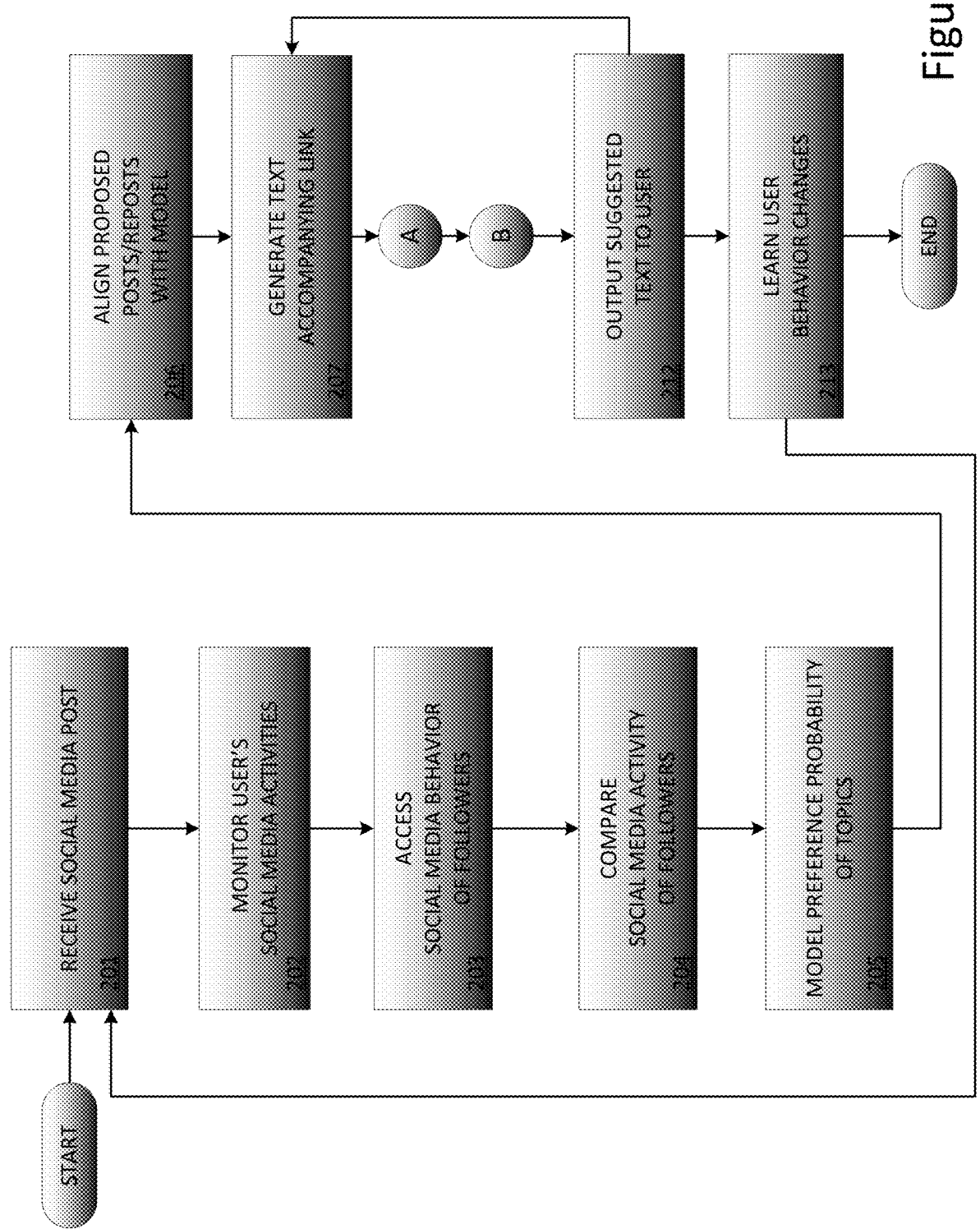
FIG. 2A illustrates a flowchart depicting operational steps of post generation system 120, in accordance with an embodiment of the present invention.

FIG. 2A illustrates a flowchart depicting operational steps of post generation system 120, in accordance with an embodiment of the present invention. In an embodiment of the invention, post generation system 120 automatically generates text for use in connection with a social media post/repost that is consistent with the writing style, opinions, preferences, personality, etc. of social media user computer 110, while being unique from previous social media posts and/or reposts from other social media users of social media service 140.

At step 201, post receiving module 121 receives via network 108 a social media post or repost from social media user computer 110. In various embodiments, the social media post or repost was never published within social media service 140 or was previously published as a social media post or repost in social media service 140. Post receiving module 121 may receive the social media post/repost via a specialized software interface integrated with post receiving module 121, via a plug-in to a web browser, or in another means.

At step 202, behavior monitoring module 122 monitors and records historic social media activities, including social media posts and reposts, to determine social media usage patterns. In various embodiments of the invention, behavior monitoring module 122 uses natural language processing (or other software) to parse and interpret the text in published posts and reposts by the user of social media user computer 110. The natural language processing software, when utilized, may be rule-based in nature, based around a machine learning model, or operate in any other way presently existing or after arising. The natural language processing software may extract one or more of intents, entities, and/or sentiment from parsed text in each post or repost and store all such data for later use. "Entities" include both entity types and entity subtypes which categorize each post or repost. Examples of entities include, for example people, places, things, etc. "Intent" includes purposes and/or goals expressed in each post or repost, including expressing an opinion or presenting an argument. "Sentiment" includes text that expresses a positive, negative, or neutral opinion towards a specific entity. Examples of sentiment that may appear in a post/repost include a negative opinion towards taxes (e.g. "Taxes are too high."), a positive opinion towards nature (e.g. "Nature is beautiful."), a neutral opinion towards cars (e.g. "I use a car."), etc.

At step 203, activity accessing module 123 accesses social media activity of social media follower computer 130. "Social media activity" as discussed herein includes published posts and reposts, links or other media shared, and posts or reposts which were liked by social media follower computer 130. In an embodiment of the invention, activity accessing module 123 accesses the social media activity of the user of social media follower computer 130 via network 108 from social media service 140 to compare with the social media activity of the user of social media user computer 110, as further described in the following step. Social media service 140 may store, for example, "likes," "dislikes," which posts are saved or reposted by certain users, posts which are ignored by certain users (such as those posts a user scrolls past without taking action), and other data.

At step 204, activity comparing module 124 compares social media activity of the user of social media user computer 110 to that of the user of social media follower computer 130 obtained in step 203 to determine the one or more commonly mentioned entities, intents, and/or sentiments. In an embodiment of the invention, activity comparing module 124 uses natural language processing to identify common entities, common sentiment towards those entities, and other data. For example, if social media user computer 110 has numerous published posts expressing a positive opinion (i.e. sentiment) towards kittens (i.e. entity) (e.g. "Kittens are wonderful."), activity comparing module 124 takes account of this positive opinion for further utilization as discussed herein.

At step 205, preference modeling module 125 of post generation system 120 generates a preference model to derive a probability of which entities, intents, and/or sentiments the user of social media follower computer 130 prefers in posts or reposts by the user of social media user computer 110, based on the aforementioned comparison (step 204). In the preferred embodiment of the invention, in training the preference model, preference modeling module 125 gathers the frequency of common entities, intents, and/or sentiments included in both published posts and reposts by the user of social media user computer 110 and the user of social media follower computer 130 to rank the popularity of certain entities, intents, and/or sentiments.

A ranking algorithm may be used at step 205 in connection with the preference model to determine and score which entities, intents, and/or sentiments in the posts and reposts by the user of social media user computer 110 are more likely to be popular among one or more social media follower computers 130. The ranking algorithm utilizes data parsed from the posts and reposts by the user of social media user computer 110 and social media follower computer 130, including any of the intent, entities, and/or sentiment parsed by the behavior monitoring module 122 in calculating scores by the ranking algorithm. The ranking algorithm compares the data parsed from both posts and reposts by the user of social media user computer 110 and the user of social media follower computer 130 to determine any similarities in the intent, entities, and/or sentiment included in published posts and reposts. The ranking algorithm may consider, in particular, a high similarity factor regarding the intent of posts and reposts by the user of social media user computer 110 and social media follower computer 130.

Figure 3:
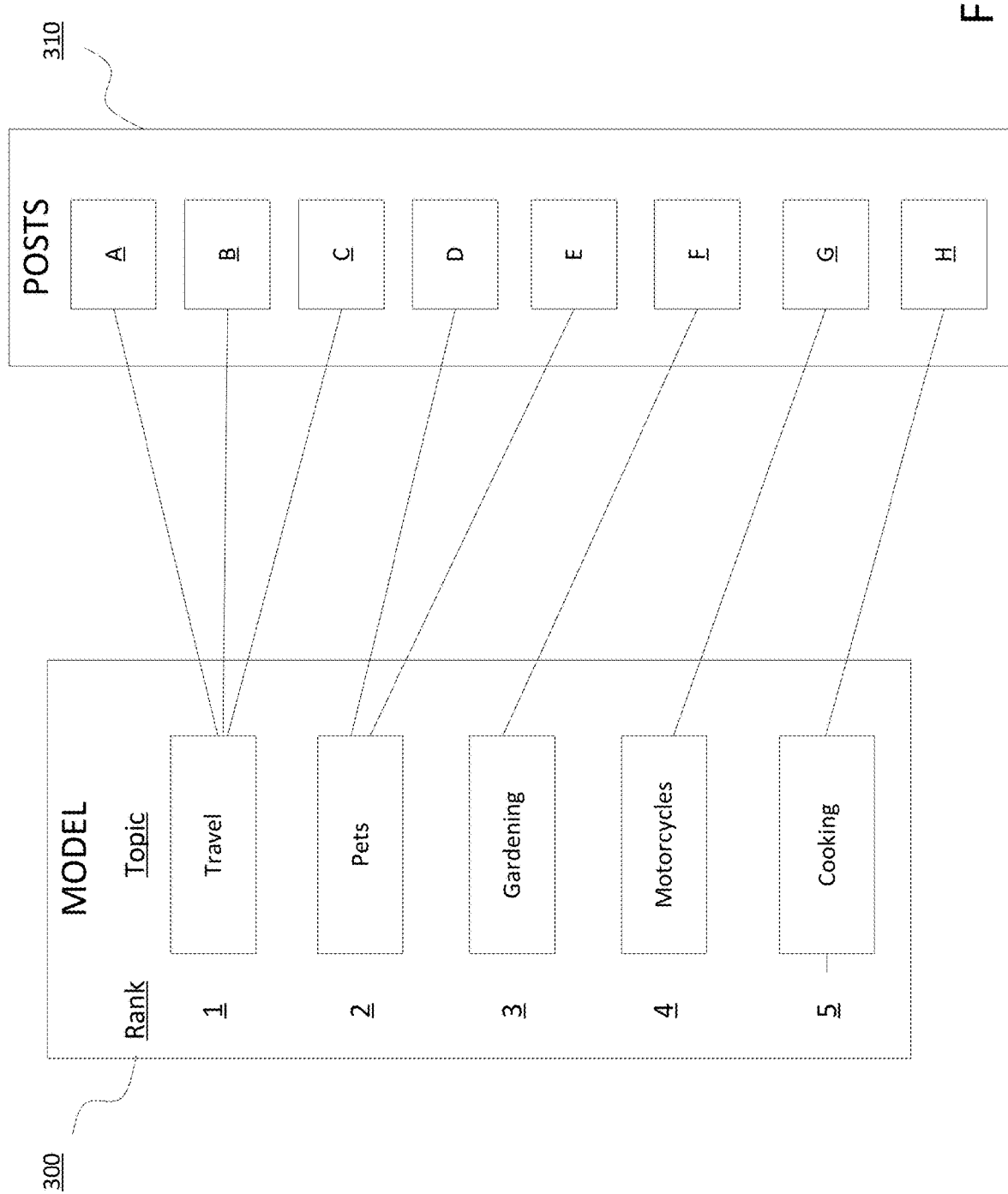
FIG. 3 depicts a preference modeling module 125 of post generation system 120 aligning social media posts with ranked topics, in accordance with an embodiment of the present invention.

In this embodiment, preference modeling module 125 may rank the popularity of certain entities, intents, and/or sentiments that the user of social media follower computer 130 is more likely to prefer based on an amount of likes that posts or reposts by the user of social media user computer 110 have. A "like", as is commonly understood by one of skill in the art, is an action that can be made by the users of one or more social media follower computers 130 on one or more posts or reposts by the user of social media user computer 110 to show favor. For example, as further displayed in connection with FIG. 3, preference modeling module 125 creates a model showing that social media user computer 110's posts and reposts that include travel have more likes from the users of social media follower computers 130 than posts and reposts that include cooking. In alternative embodiments, quantitative assessments of one or more of "dislikes," saving of social media post/reposts, ignoring of social media posts/reposts, and/or other data is considered.

As an example illustrating the actions of an embodiment (displayed in more depth in connection with FIG. 3), preference modeling module 125 ranks the popularity of five entities 300 (travel, pets, gardening, motorcycles, and cooking) to model probability of preference of entities in posts and reposts by the user of social media user computer 110 among the users of social media follower computers 130. Preference modeling module 125 determines the most popular entity "travel" has the highest frequency of likes, with pets as the second highest (2), gardening as the third highest (3), motorcycles as the fourth highest (4), and as cooking the lowest ranked (5).

At step 206, post aligning module 126 aligns one or more posts/reposts by the user of social media user computer 110 posts/reposts. In the embodiment described above, the one or more posts/reposts are aligned specifically to the ranked entities in performing this function. As further displayed in connection with FIG. 3, post aligning module 126 aligns posts 310 by the user of social media user computer 110 to the ranked topics accordingly in the model 300, based on the frequency of entities included within each post: posts A, B, and C include entities relating to travel, posts D and E include entities relating to pets, post F includes entities relating to gardening, post G includes entities relating to motorcycles, and post H includes entities relating to cooking. In a further embodiment of the invention, a statistical classification is performed by the post aligning module 126 when aligning posts/reposts.

At step 207, text generating module 127 generates dynamic or static text to accompany the received social media post (which may include shared link(s), other media, etc., as appropriate), based upon the output of the post aligning module 126 and as otherwise described herein. In an embodiment of the invention natural language processing is utilized to parse and analyze text that has been used in existing published posts or reposts (such as those that share the same link, or otherwise) within the social media service 140. Text generating module 127 uses the data obtained from the previous steps, and as otherwise discussed herein, to generate dynamic text that is consistent with writing style, opinions, preferences, personality, etc. of the user of social media user computer 110, while nonetheless being unique from posts and reposts of other users of social media users who have shared the same link. In the embodiment discussed above, text generating module 127 generates text related to "travel," since it is the highest ranked of the topics the preference modeling module 125 has ranked. If this generated text is rejected by user (as further discussed below), text generating module 127 may generate text related to "pets" since it is the second ranked topic, and so on.

In various embodiments, text generating module 127 may insert an image, video, and/or audio with similar or the same intents, entities, and/or sentiment in place of or in addition to dynamic text in the unpublished post or repost. The image, video, and/or audio may be extracted from one or more computer readable storage media 910 and/or from open source media, available via social media service 140. With regard to the embodiment discussed above, the image, video, and/or audio selected and inserted by text generating module 127 is related to the entity "travel," such as, for example, an image of a beach umbrella or a plane, a video of walking the streets of Italy, or an audio recording of waves crashing on a tropical beach.

In various embodiments, after step 207, execution proceeds to step 208 of FIG. 2B, as further discussed below, prior to proceeding to step 212. In other embodiments, following step 207, execution may proceed directly to step 212.

At step 212, notification module 128 outputs the recommended text to social media user computer 110 via the post managing interface 114. In an embodiment, the recommended text may be presented to social media user computer 110 in the form of a push notification or a pop-up window that is displayed on post managing interface 114 in real time. The user of social media user computer 110 may select the recommended text for publication to the social media service 140, and, if selected, it is automatically published on social media service 140. If the user of social media user computer 110 rejects the recommended text, execution may return to step 207 to generate a subsequent recommended text for publication.

A push notification is a message that is sent from a backend server, application, or the equivalent to user interface 112. Push notifications are used for applications to bring information to the user for their immediate attention without waiting for polling software to pull the information from a server, application, etc. Alternately, a pop-up window or would also appear automatically on user interface 112, for selection and publication by the user.

At step 213, learning module 129 learns of any behavioral changes in the social media activities of user at social media user computer 110 resulting in the publication of the post or repost. In an embodiment, learning module 129 utilizes machine learning to determine if there are any changes in the behavior of the user of social media user computer 110 from the received post or repost, such as, for example, sentiment towards certain entities, change of intent with regard to a social media post, etc. Learning module 129 feeds these one or more changes to behavior module 122 for the text generating module 127 to generate new dynamic or static text appropriate to the one or more changes. For example, learning module 122 determines that the user of social media user computer 110 has a change of sentiment towards motorcycles because one or more historical posts and reposts indicated positive sentiment towards motorcycles (e.g. "Motorcycles are fun."), while the received published post/repost indicates negative sentiment towards motorcycles (e.g. "Motorcycles are too dangerous."). Learning module 129 feeds this change in sentiment towards the entity motorcycles to behavior monitoring module 122 for the text generating module 127 to generate new text indicating negative sentiment instead of positive sentiment towards motorcycles, thereby incorporating the behavioral changes in new dynamic or static text. Learned changes in behavior of the user of social media user computer 110 may thereby be utilized in further iterations of the presently disclosed invention.

After step 213, execution may return to step 201, or execution terminates for assorted reasons. Termination may occur, for example, if user at social media user computer 110 no longer desires to utilize the presently disclosed invention, if all users of social media follower computers 130 log-off, or according to a timed or scheduled basis.

Figure 2B:
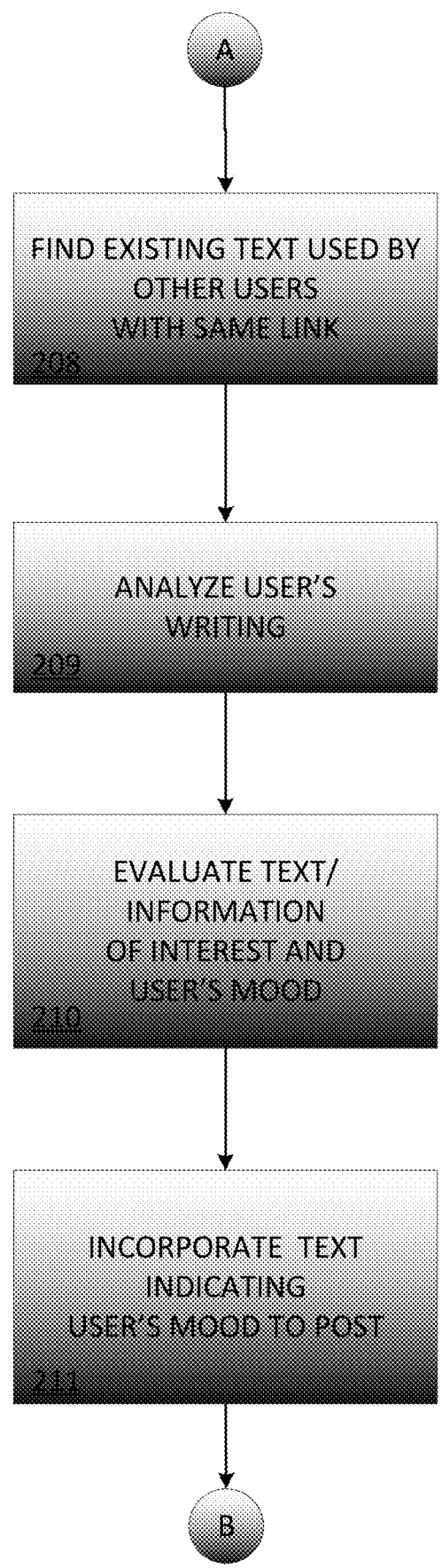
FIG. 2B illustrates a flowchart depicting operational steps of text generating module 126 of post generation system 120, in accordance with an embodiment of the present invention.

FIG. 2B illustrates a flowchart depicting operational steps of text generating module 127 of post generation system 120, in accordance with an embodiment of the invention. As discussed previously, FIG. 2B may be entered after step 207 of FIG. 2A where dynamic text is generated, in various embodiments of the invention. As discussed previously in connection with FIG. 2A, in the embodiment, text generating module 127 may leverage natural language processing software to generate dynamic text for publication in social media service 140, and then perform other steps as further performed below.

At step 208, text generating module 127 parses and analyzes text used in existing published posts or reposts of other users of social media user computers 110 sharing the same link as social media user computer 110's unpublished post or repost (or, alternately, same post, multimedia, etc.). In various embodiments, text generating module 127 browses existing published posts or reposts on social media service 140 sharing the same link as an unpublished post or repost by the user of social media user computer 110 within social media service 140. In these embodiments, text generating module 127 utilizes natural language processing to parse these existing published posts or reposts for similarities in language, syntax, entities, sentiment, etc. with the unpublished post or repost by the user of social media user computer 110.

At step 209, text generating module 127 analyzes the text in published posts and reposts by the user of social media user computer 110 from the data gathered in the aforementioned steps to determine a mood of the user of social media user computer 110 towards specific entities, intents, and/or sentiments. In these embodiments, text generating module 127 utilizes natural language processing and machine learning to parse text in the relevant published posts or reposts by the user of social media user computer 110 and detect patterns in linguistic style. In various embodiments, text generating module 127 may use sentiment analysis to detect positive, negative, or neutral sentiment towards certain entities and to determine opinions, preferences, personality, etc. of the user of social media user computer 110. In this embodiment, text generating module 127 parses the text in posts and reposts published by the user of social media user computer 110 to detect patterns in linguistic style including but not limited to word frequencies, complexity of language, sentence structure, use of commas, etc.

At step 210, text generating module 127 identifies text of the most interest to a network of social media users utilizing social media service 140 who follow the user of social media user computer 110 based on probability of preference derived from the model and current mood. In the various embodiments, text generating module 127 may utilize the data used from the previous step and the modeling step (step 205) to select new text that is the most consistent with the user of social media user computer 110 in terms of linguistic styles and positive, negative, or neutral sentiment towards certain entities, while being unique from text in posts or reposts of other social media user sharing the same link. Text generating module 127 may also determine a mood of the user of social media user computer 110 by parsing the text or previous posts/reposts by social media user computer 110.

In these embodiments, at step 210 text generating module 127 may also choose text in the form of a hashtag to be incorporated in social media user computer 110's unpublished post or repost. A hashtag as discussed herein is a word or phrase preceded by a hash or pound sign (#) that classifies or categorizes the accompanying text. Hashtags index posts and reposts within social media service 140 so that social media follower computers 130 and other social media user computer(s) 110 are able to discover the post or repost with simple search commands aggregating such data, or otherwise.

At step 211, text generating module 127 incorporates the selected text indicating mood of the user of social media user computer 110 to the unpublished post or repost. In the various embodiments, text generating module 127 operates in real time. In the various embodiments, text generating module 127 processes the text in the form of a sentence that will be output to social media user computer 110 in the form of a push notification or pop-up window, as discussed elsewhere herein. In these embodiments, the user of social media user computer 110 may choose whether to include the recommended text into the unpublished post or repost.

In further embodiments, text generating module 127 may also incorporate images, videos, and/or audio to be accompanied by the dynamic text in the unpublished post or repost, as further discussed herein.

Figure 4:
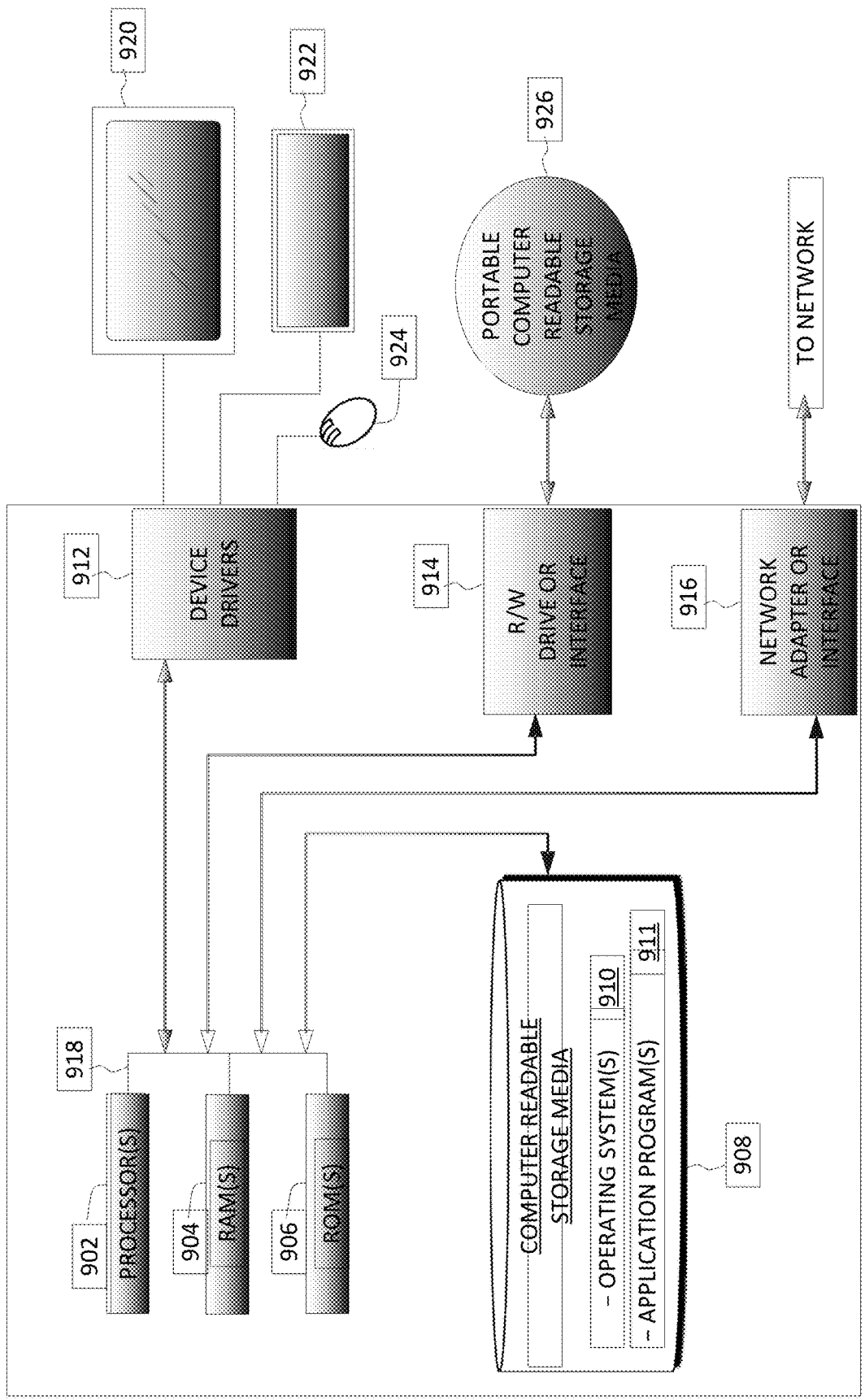
FIG. 4 depicts a block diagram of components of dynamic text generation environment 100 of FIG. 1, in accordance with an embodiment of the present invention.

FIG. 4 depicts a block diagram of components of the social media user computer 110, post generation system 120, social media follower computer 130, and social media service 140 in the dynamic text generation environment 100, in accordance with an embodiment of the present invention. It should be appreciated that FIG. 4 provides only an illustration of one implementation and does not imply any limitations with regard to the environments in which different embodiments may be implemented. Many modifications to the depicted environment may be made.

Social media user computer 110, post generation system 120, social media follower computer 130, and social media service 140 may include one or more processors 902, one or more computer-readable RAMs 904, one or more computer-readable ROMs 906, one or more computer readable storage media 908, device drivers 912, read/write drive or interface 914, network adapter or interface 916, all interconnected over a communications fabric 918. Communications fabric 918 may be implemented with any architecture designed for passing data and/or control information between processors (such as microprocessors, communications and network processors, etc.), system memory, peripheral devices, and any other hardware components within a system.

One or more operating systems 910, and one or more application programs 911, for example, the dynamic text generation environment 100, are stored on one or more of the computer readable storage media 908 for execution by one or more of the processors 902 via one or more of the respective RAMs 904 (which typically include cache memory). In the illustrated embodiment, each of the computer readable storage media 908 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Social media user computer 110, post generation system 120, social media follower computer 130, and social media service 140 may also include a R/W drive or interface 914 to read from and write to one or more portable computer readable storage media 926. Application programs 911 on social media user computer 110, post generation system 120, and social media follower computer 130 may be stored on one or more of the portable computer readable storage media 926, read via the respective R/W drive or interface 914 and loaded into the respective computer readable storage media 908.

Social media user computer 110, post generation system 120, social media follower computer 130, and social media service 140 may also include a network adapter or interface 916, such as a TCP/IP adapter card or wireless communication adapter (such as a 4G wireless communication adapter using OFDMA technology). Application programs 911 on social media user computer 110, post generation system 120, social media follower computer 130, and social media service 140 may be downloaded to the computing device from an external computer or external storage device via a network (for example, the Internet, a local area network or other wide area network or wireless network) and network adapter or interface 916. From the network adapter or interface 916, the programs may be loaded onto computer readable storage media 908. The network may comprise copper wires, optical fibers, wireless transmission, routers, firewalls, switches, gateway computers and/or edge servers.

Social media user computer 110, post generation system 120, social media follower computer 130, and social media service 140 may also include a display screen 920, a keyboard or keypad 922, and a computer mouse or touchpad 924. Device drivers 912 interface to display screen 920 for imaging, to keyboard or keypad 922, to computer mouse or touchpad 924, and/or to display screen 920 for pressure sensing of alphanumeric character entry and user selections. The device drivers 912, R/W drive or interface 914 and network adapter or interface 916 may comprise hardware and software (stored on computer readable storage media 908 and/or ROM 906).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a method, computer program product, and/or computer system at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, computer program products, and apparatus (systems) according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of method, system, and computer program product according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
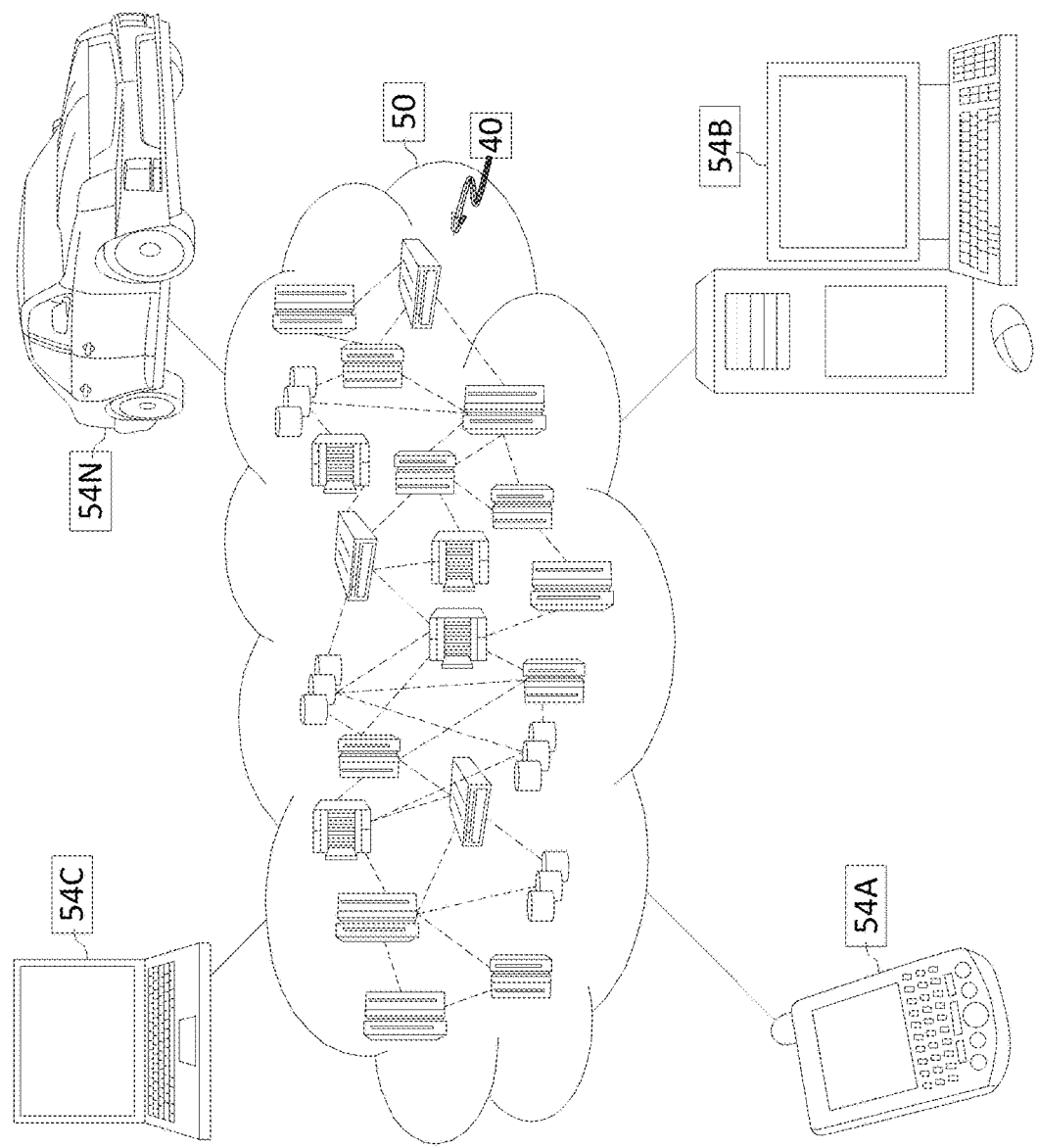
FIG. 5 depicts a cloud computing environment, in accordance with an embodiment of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
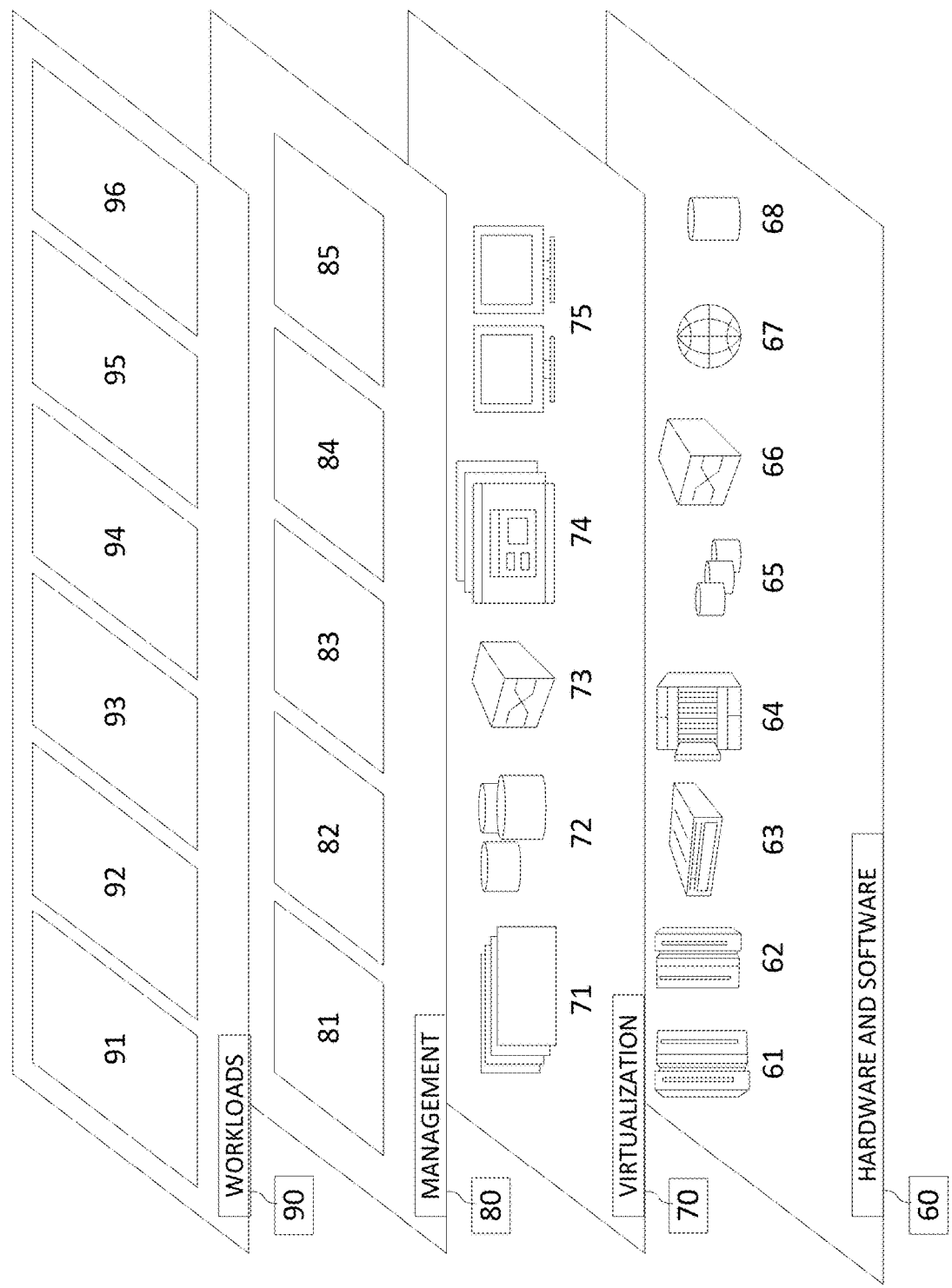
FIG. 6 depicts abstraction model layers, in accordance with an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA. Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and dynamic text generation environment 100.

Based on the foregoing, a method, system, and computer program product have been disclosed. However, numerous modifications and substitutions can be made without deviating from the scope of the present invention. Therefore, the present invention has been disclosed by way of example and not limitation.

What is claimed is:

1. A method for sharing a social media post with automatically generated dynamic text in a social media service, the method comprising:
  receiving by a computing device a social media post;
  monitoring by the computing device social media activities of a social media user computer;

accessing by the computing device one or more social media activities of social media follower computers;

comparing the one or more social media activities of the social media user computer with the one or more social media activities of social media follower computers;

aligning the received social media post to a preference model, wherein the preference model is based on the compared social media activities of the social media user computer compared with the one or more social media activities of social media follower computers;

generating by the computing device dynamic text in real time to accompany the received social media post; and outputting by the computing device the generated dynamic text to the social media user computer to accompany the received social media post.

2. The method of claim 1, wherein the social media activities of the social media user computer are compared with the social media activities of the social media follower computer based on common entities included in both the social media activities of the social media user computer and the social media activities of the social media follower computers.

3. The method of claim 2, wherein the preference model is derived from a frequency of use of common entities and an amount of likes in social media activities of the social media user computer and social media activities of social media follower computers.

4. The method of claim 1, wherein the previously published social media posts of social media user computer are aligned with the preference model according to the common entities in the social media activities of the social media user computer and the social media activities of the social media follower computers.

5. The method of claim 1, wherein generating by the computing device dynamic text in real time comprises one or more of the following:

finding by the computing device existing text used in social media posts of social media user computers sharing the same link;

analyzing by the computing device the existing text;

evaluating the existing text for a mood of the social media user computer; and incorporating the mood of the social media user computer into the generated dynamic text.

6. The method of claim 5, wherein generating by the computing device dynamic text in real time further comprises:

evaluating by the computing device a writing style of the existing text by the computing device; and incorporating by the computing device the writing style into the generated dynamic text.

7. The method of claim 1, further comprising:

utilizing by the computing device a machine learning algorithm to learn behavioral changes in the social media activities of the social media user computer.

8. The method of claim 7, wherein the learned behavioral changes in the social media activities are incorporated into the generated dynamic text for a received social media post.

9. The method of claim 1, further comprising previous to aligning the received social media post to the preference model, generating by the computing device the preference model.

10. A computer program product using a computing device to share a social media post with automatically generated dynamic text in a social media service, the computer program product comprising:

one or more non-transitory computer-readable storage media and program instructions stored on the one or more non-transitory computer-readable storage media, the program instructions, when executed by the computing device, cause the computing device to perform a method comprising:

receiving by a computing device a social media post;

monitoring by the computing device social media activities of a social media user computer;

accessing by the computing device one or more social media activities of social media follower computers;

comparing the one or more social media activities of the social media user computer with the one or more social media activities of social media follower computers;

aligning the received social media post to a preference model, wherein the preference model is based on the compared social media activities of the social media user computer compared with the one or more social media activities of social media follower computers;

generating by the computing device dynamic text in real time to accompany the received social media post; and outputting by the computing device the generated dynamic text to the social media user computer to accompany the received social media post.

11. The computer program product of claim 10, further comprising generating by the computing device the preference model, wherein the preference model is derived from a frequency of use of common entities and an amount of likes in social media activities of the social media user computer and social media activities of social media follower computers.

12. The computer program product of claim 10, wherein generating by the computing device dynamic text in real time comprises one or more of the following:

finding by the computing device existing text used in social media posts of social media user computers sharing the same link;

analyzing by the computing device the existing text;

evaluating the existing text for a mood of the social media user computer; and incorporating the mood of the social media user computer into the generated dynamic text;

evaluating by the computing device a writing style of the existing text by the computing device; and incorporating by the computing device the writing style into the generated dynamic text.

13. The computer program product of claim 10, further comprising:

utilizing by the computing device a machine learning algorithm to learn behavioral changes in the social media activities of the social media user computer.

14. The computer program product of claim 13, wherein the learned behavioral changes in the social media activities are incorporated into the generated dynamic text for a received social media post.

15. A computer system sharing a social media post with automatically generated dynamic text in a social media service, the computer system comprising:

one or more computer processes;

one or more computer-readable storage media;

program instructions stored on the computer-readable storage media for execution by at least one of the one or more processors, the program instructions comprising:

program instructions to receive a social media post;

program instructions to monitor social media activities of a social media user computer;

program instructions to access one or more social media activities of social media follower computers;

program instructions to compare the one or more social media activities of the social media user computer with the one or more social media activities of social media follower computers;

program instructions to align the received social media post to a preference model, wherein the preference model is based on the compared social media activities of the social media user computer compared with the one or more social media activities of social media follower computers;

program instructions to generate dynamic text in real time to accompany the received social media post; and program instructions to output the generated dynamic text to the social media user computer to accompany the received social media post.

16. The computer system of claim 15, further comprising program instructions to generate the preference model, wherein the preference model is derived from a frequency of use of common entities and an amount of likes in social media activities of the social media user computer and social media activities of social media follower computers.

17. The computer system of claim 15, wherein the social media activities of the social media user computer are compared with the social media activities of the social media follower computer based on common entities included in both the social media activities of the social media user computer and the social media activities of the social media follower computers.

18. The computer system of claim 15, wherein the program instructions to generate dynamic text in real time comprises one or more of the following:

program instructions to find existing text used in social media posts of social media user computers sharing the same link;

program instructions to analyze the existing text;

program instructions to evaluate the existing text for a mood of the social media user computer; and program instructions to incorporate the mood of the social media user computer into the generated dynamic text;

program instructions to evaluate a writing style of the existing text by the computing device; and program instructions to incorporate the writing style into the generated dynamic text.

19. The computer system of claim 15, further comprising:

program instructions to utilize a machine learning algorithm to learn behavioral changes in the social media activities of the social media user computer.

20. The computer system of claim 19, wherein the learned behavioral changes in the social media activities are incorporated into the generated dynamic text for a received social media post.

* * * * *